United States Patent [19]

Hayes

[11] Patent Number: 4,944,775
[45] Date of Patent: Jul. 31, 1990

[54] PREPARATION OF POLY(PHENYLENE OXIDE) ASYMMETRIC GAS SEPARATION MEMBRANES

[75] Inventor: Richard A. Hayes, Parkersburg, W. Va.

[73] Assignee: E. I. du Pont de Nemours and Company, Wilmington, Del.

[21] Appl. No.: 378,097

[22] Filed: Jul. 11, 1989

[51] Int. Cl.$^5$ ............... B01D 53/22; B01D 69/04; B01D 71/38

[52] U.S. Cl. ............... 55/16; 55/68; 55/158; 264/178 F; 264/211.14

[58] Field of Search ............... 55/16, 68, 158, 70, 55/73; 264/176.1, 178 F, 211.14

[56] References Cited

U.S. PATENT DOCUMENTS

| | | | |
|---|---|---|---|
| 3,350,844 | 11/1967 | Robb | 55/16 |
| 3,709,774 | 1/1973 | Kimura | 55/16 X |
| 3,762,136 | 10/1973 | Kimura | 55/158 |
| 3,846,521 | 11/1974 | Osterholtz | 55/16 X |
| 3,852,388 | 12/1974 | Kimura | 55/16 X |
| 4,080,743 | 3/1978 | Manos | 55/16 X |
| 4,080,744 | 3/1978 | Manos | 55/16 X |
| 4,120,098 | 10/1978 | Manos | 55/16 X |
| 4,157,960 | 6/1979 | Chang et al. | 55/16 X |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |
| 4,209,307 | 6/1980 | Leonard | 55/158 X |
| 4,427,419 | 1/1984 | Li | 55/16 |
| 4,468,500 | 8/1984 | Malon et al. | 55/16 X |
| 4,468,501 | 8/1984 | Zampini et al. | 55/16 X |
| 4,468,502 | 8/1984 | Malon et al. | 55/16 X |
| 4,468,503 | 8/1984 | Zampini et al. | 55/16 X |
| 4,472,175 | 9/1984 | Malon et al. | 55/16 |
| 4,521,224 | 6/1985 | Li | 55/16 |
| 4,530,703 | 7/1985 | Malon et al. | 55/16 |
| 4,551,156 | 11/1985 | Li | 55/16 |
| 4,586,939 | 5/1986 | Li | 55/16 |
| 4,596,860 | 6/1986 | Percec et al. | 55/16 X |
| 4,647,297 | 3/1987 | Zampini | 55/16 X |
| 4,652,283 | 3/1987 | Zampini et al. | 55/16 X |
| 4,684,376 | 8/1987 | Percec et al. | 55/16 |
| 4,699,634 | 10/1987 | Percec et al. | 55/158 X |
| 4,746,476 | 5/1988 | Kohn | 55/16 X |

FOREIGN PATENT DOCUMENTS

| | | | |
|---|---|---|---|
| 0216633 | 4/1987 | European Pat. Off. | |
| 57-117321 | 7/1982 | Japan | 55/158 |
| 62-030524 | 2/1987 | Japan | 55/158 |
| 62-57915 | 3/1987 | Japan | |

*Primary Examiner*—Robert Spitzer

[57] ABSTRACT

A process for producing integrally-skinned asymmetric poly(phenylene oxide) gas separation membranes is disclosed. The process involves forming a solution of the poly(phenylene oxide) in an aprotic solvent at an elevated temperature, forming a nascent membrane from the solution, partially drying the nascent membrane, followed by coagulating the partially dried nascent membrane in a coagulation bath formed from a non-solvent for the poly(phenylene oxide) which non-solvent is miscible with the aprotic solvent.

27 Claims, No Drawings

PREPARATION OF POLY(PHENYLENE OXIDE) ASYMMETRIC GAS SEPARATION MEMBRANES

BACKGROUND OF THE INVENTION

1. Field of the Invention

The present invention relates to a process for preparing poly(phenylene oxide) asymmetric gas separation membranes by forming a solution of the polymer in an aprotic solvent or mixtures of aprotic solvents or mixtures of one or more aprotic solvents with another solvent or non-solvent forming a premembrane followed by evaporation of solvent and coagulation.

2. Prior Art

U.S. Pat. No. 3,350,844 discloses the use of dense poly(phenylene oxide) membranes for gas separations.

U.S. Pat. No. 3,709,774, U.S. Pat. No. 3,762,136, and U.S. Pat. No. 3,852,388 disclose asymmetric poly(phenylene oxide) gas separation membranes and a process to prepare same.

EPO-216,633 discloses composite gas separation membranes comprising a plasma condensate on top of a porous poly(phenylene oxide) support membrane. The gas selectivity observed is attributed to the plasma condensate layer.

SUMMARY OF THE INVENTION

The present invention relates to the process by which integrally-skinned asymmetric poly(phenylene oxide) gas separation membranes are produced and the processes to utilize them in gas separations. The preparative process includes the preparation of suitable polymer solutions in aprotic solvent mixtures at elevated temperatures, an evaporative step, and coagulation. Said membranes have been found to have greater asymmetry than found in the previously known asymmetric poly(phenylene oxide) gas separation membranes. The membranes of the present invention are useful for separating many gas mixtures with improved efficiency.

DETAILED DESCRIPTION

The separation of one or more gases from a complex multicomponent mixture of gases has been found to be necessary in a large number of industries. Such separations currently are undertaken commercially by such processes as cryogenics, pressure swing adsorption and membrane separations. In certain of the separations, membrane separations have been found to be economically more viable than other processes. In a gas separation process, one side of the membrane is contacted with a complex multicomponent gas mixture and certain of the gases of said mixture permeate through the membrane faster than the other gases. Gas separation membranes are semi-permeable. They allow for some gases to permeate through them while serving as a barrier to other gases in a relative sense. The relative gas permeation rate through the membrane (gas selectivity) is an intrinsic property of the membrane material composition. It has been suggested in the prior art that this intrinsic membrane material selectivity is a combination of gas diffusion, controlled inpart by the packing and molecular free volume of the material, and gas solubility within the material. It is highly desirable to form pinhole free dense separating layers in said membranes in order to retain the high intrinsic gas selectivities.

Poly(phenylene oxide) has long been considered important as a gas separation material. This importance has been ascribed due to its good gas permeation properties, physical properties, and commercial availability. For example, U.S. Pat. No. 3,350,844 discloses the use of dense poly(phenylene oxide) membranes for gas separations. However, such dense membranes suffer from low gas permeation rates. The gas permeation rate is inversely proportional to the thickness of the dense gas separating layer, as is well known in the prior art.

This shortcoming has been partially overcome in the prior art through the preparation of asymmetric poly(phenylene oxide) gas separation membranes. Asymmetric membranes allow for thinner dense separating layers by mechanically supporting said layers on porous substrates. For example, U.S. Pat. No. 3,709,774, U.S. Pat. No. 3,762,136, and U.S. Pat. No. 3,852,388 describe such asymmetric poly(phenylene oxide) gas separation membranes and the process by which they may be prepared. Such asymmetric membranes suffer from the shortcoming of not being relatively very asymmetric. This, in turn, gives rise to relatively thick dense separating layers. The gas permeation rate is, therefore, relatively slow. This is not desirable.

Previous processes for the preparation of said asymmetric poly(phenylene oxide) gas separation membranes suffer from the shortcoming of using relatively hazardous and toxic halocarbon solvents. The use of such halocarbon solvents, such as chloroform, has been taught in the prior art to have certain hazards. Further, relatively high solids solutions of poly(phenylene oxide) in such solvents is not possible. This is a limitation in the preparation of asymmetric poly(phenylene oxide) gas separation membranes.

The present invention circumvents the above shortcomings and provides a process for the preparation of highly asymmetric poly(phenylene oxide) gas separation membranes without the use of the beforementioned halocarbon solvents. The present process involves the dissolution of said poly(phenylene oxide) in a suitable aprotic solvent mixture at elevated temperature, extrusion of said polymer solution, an evaporative step, and coagulation in a suitable bath comprising a polymer nonsolvent miscible with said aprotic polymer solvent.

The main constituent of suitable solvent mixtures are aprotic solvents, such as N-methyl pyrrolidone and N,N-dimethylacetamide. Such aprotic solvents may be used alone or in combination with other cosolvents or nonsolvents. Suitable cosolvents may include aromatic hydrocarbons, such as toluene and xylene. Suitable nonsolvents, such as dipropylene glycol, may be incorporated to adjust the solvation power of the solvent mixture. Such additives have been taught to modify the asymmetry of gas separation membranes of different compositions in the past.

Suitable solids levels of poly(phenylene oxide) materials, for example poly(2,6-dimethylphenylene-1,4-oxide), in said aprotic solvent mixtures can range from 5 to 50 percent (by weight), preferably 15 to 35 percent (by weight). As one knowledgeable in the art may discern, poly(2,6-dimethylphenylene-1,4-oxide) is not soluble in such aprotic solvents or solvent mixtures under ambient conditions. Such polymer mixtures must be heated at from 50° C. to 200° C., preferably 70° C. to 25° C., to effect dissolution. Said polymer solutions may then be cast or extruded to form nascent flat membranes or nascent hollow fiber membranes. The as formed nascent membranes are then dried from 0.005 to 10 minutes, preferably 0.05 to 5.0 minutes, at from 20° C. to 200° C., preferably 70° C. to 125° C. The partially dried nascent membrane is then precipitated in a coagulation bath at from 0° C. to 80° C., preferably 10° C. to 30° C. The coagulation bath should be a nonsolvent for the beforementioned poly(phenylene oxide) while being miscible with the main constituent of the aprotic solvent mixture. Suitable coagulation bath compositions include lower alcohols containing from 1 to 10 carbon atoms, for example, methanol, ethanol, and isopropanol, lower ketones containing from 1 to 10 carbon atoms, for example acetone and methyl ethyl ketone, and aqueous solutions, for example, water, or mixtures thereof. The preferred coagulation bath is water.

The wet membranes may be dried by air drying or through prior art processes. For example, they may be dried through the sequential replacement of water with more hydrophobic materials followed by drying as taught in U.S. Pat. No. 4,080,743, U.S. Pat. No. 4,080,744, U.S. Pat. No. 4,120,098, and EPO-219,878.

The integrally-skinned asymmetric poly(phenylene oxide) membranes disclosed herein have found use in gas separations. The present invention finds use in the enrichment of oxygen and nitrogen from air for increased combustion or inerting streams, respectively; in recovery of hydrogen in refinery and ammonia plants; separation of carbon monoxide from hydrogen in syngas systems; and separation of carbon dioxide or hydrogen sulfide from hydrocarbons.

EXAMPLES

The solution compositions described in Table 1 were prepared. The poly(2,6-dimethylphenylene-1,4-oxide) (PPO) used was a commercial product of the General Electric Corporation having a molecular weight of about 40,000. The main constituents of the aprotic solvent mixture were N-methylpyrrolidone (NMP) and N,N-dimethylacetamide (DMAc). Dissolution of said compositions was effected by heating from 80° C. to 125° C.

The beforementioned polymer solutions were cast onto a glass plate at the temperature listed in Table 2 with a 15-mil ($38 \times 10^{-5}$ m) knife gap. the nascent membranes were dried at the temperature listed in Table 2 for the time listed in Table 2. The partially evaporated nascent membranes were then precipitated in an aqueous coagulation bath at 25° C.±5° C. The membranes were then washed in water for from 5 to 24 hours at room temperature. The resulting water-wet membranes were dried in a vacuum oven at 20 inches (0.51m) mercury and room temperature overnight and from 65° C. to 120° C. for 2 to 4 hours.

The membranes were all tested for pure gas helium and nitrogen permeabilities at 100 psig (689 KPa), 25° C.±5° C. The results are reported in Table 3. Solution-membrane examples 10-A, 10-B, 10-C, and 10D were tested for pure gas carbon dioxide permeabilities at 100 psig (689 KPa), 25° C.±5° C. The results are reported in Table 3. Solution-membrane examples 2-A, 2-B, 2-C, 3-B, 4-A, 4-B, 6-A, 6-B, 7-A, 8-B, 8-C, 9-B, 10-B, and 10-D were tested for mixed gas oxygen/nitrogen (21/79, mole) permeabilities at 100 psig (689 KPa), 25° C.±5° C. The results are reported in Table 3.

TABLE 1

| | Membrane Casting Formulations | | | | | |
|---|---|---|---|---|---|---|
| Solution | PPO (g) | Aprotic Solvents (g) | | Cosolvents (g) | | Nonsolvents (g) |
| 1 | 20 | NMP | 80 | | | |
| 2 | 22 | NMP | 78 | | | |
| 3 | 22 | NMP | 58.5 | | | |
| | | DMAc | 19.5 | | | |
| 4 | 22 | NMP | 39 | | | |
| | | DMAc | 39 | | | |
| 5 | 22 | NMP | 58.5 | Toluene | 19.5 | |
| 6 | 22 | NMP | 58.5 | Xylene | 19.5 | |
| 7 | 24 | NMP | 76 | | | |
| 8 | 26 | NMP | 74 | | | |
| 9 | 26 | NMP | 66.2 | | | Dipropylene Glycol 7.8 |
| 10 | 28 | NMP | 72 | | | |

TABLE 2

Membrane Casting Conditions

| Solution-Membrane | Air Drying Time (min) | Air Drying Temp (°C.) |
|---|---|---|
| 1-A | 4.0 | 100 |
| 1-B | 1.5 | 125 |
| 1-C | 4.0 | 125 |
| 2-A | 2.0 | 110 |
| 2-B | 3.0 | 110 |
| 2-C | 4.0 | 110 |
| 3-A | 2.5 | 110 |
| 3-B | 3.0 | 110 |
| 4-A | 2.5 | 110 |
| 4-B | 3.0 | 110 |
| 5-A | 3.5 | 80 |
| 5-B | 3.5 | 100 |
| 6-A | 2.0 | 100 |
| 6-B | 3.0 | 100 |
| 7-A | 2.0 | 100 |
| 7-B | 3.0 | 100 |
| 7-C | 4.0 | 100 |
| 8-A | 1.0 | 110 |
| 8-B | 3.5 | 110 |
| 8-C | 4.0 | 110 |
| 9-A | 0.5 | 110 |
| 9-B | 0.5 | 110 |
| 10-A | 1.0 | 110 |
| 10-B | 1.0 | 110 |
| 10-C | 2.5 | 110 |
| 10-D | 2.5 | 110 |

TABLE 3

Membrane Performance Data

| Solution-Membrane | PHe (GPU) | PHe/PN$_2$ | PCO$_2$ (GPU) | PCO$_2$/PN$_2$ | PO$_2$ (GPU) | PO$_2$/PN$_2$ |
|---|---|---|---|---|---|---|
| 1-A | 900 | 14.4 | | | | |
| 1-B | 2,200 | 10.5 | | | | |
| 1-C | 400 | 19.1 | | | | |
| 2-A | 1,000 | 6.0 | | | 320 | 1.7 |
| 2-B | 1,060 | 22.1 | | | 180 | 3.7 |
| 2-C | 820 | 22.0 | | | 150 | 3.7 |
| 3-A | 1,310 | 21.1 | | | | |
| 3-B | 200 | 17.3 | | | 38 | 4.2 |
| 4-A | 300 | 25.5 | | | 49 | 4.3 |
| 4-B | 390 | 23.9 | | | 71 | 4.0 |
| 5-A | 590 | 12.9 | | | | |
| 5-B | 320 | 12.9 | | | | |
| 6-A | 660 | 21.6 | | | 100 | 3.8 |
| 6-B | 220 | 17.6 | | | 41 | 3.7 |
| 7-A | 790 | 29.9 | | | 121 | 4.2 |
| 7-B | 700 | 18.5 | | | | |
| 7-C | 450 | 23.8 | | | | |
| 8-A | 1,330 | 12.7 | | | | |
| 8-B | 490 | 24.6 | | | 84 | 3.9 |
| 8-C | 340 | 29.3 | | | 58 | 4.1 |
| 9-A | 600 | 20.9 | | | | |
| 9-B | 730 | 16.3 | | | 123 | 2.7 |
| 10-A | 740 | 16.4 | 398 | 8.8 | | |
| 10-B | 790 | 17.2 | 395 | 8.6 | 160 | 3.4 |
| 10-C | 530 | 20.8 | 283 | 11.1 | | |

TABLE 3-continued

| Solution-Membrane | Membrane Performance Data | | | | | |
|---|---|---|---|---|---|---|
| | PHe (GPU) | PHe/PN$_2$ | PCO$_2$ (GPU) | PCO$_2$/PN$_2$ | PO$_2$ (GPU) | PO$_2$/PN$_2$ |
| 10-D | 210 | 12.0 | 85 | 4.8 | 80 | 3.2 |

$$GPU = 10^6 \times \frac{cm^3 \, (STP)}{cm^2 \, sec \, (cmHg)}$$

I claim:

1. A process for preparing an integrally-skinned asymmetric poly(phenylene oxide) gas separation membrane comprising, forming a solution of from 5 to 50 weight percent of film forming molecular weight poly(2,6-dimethyl-phenylene-1,4-oxide) in a solvent mixture comprising a main constituent of an aprotic solvent at from 50° C. to 200° C., forming said solution into a nascent membrane, partially drying said nascent membrane for 0.005 to 10 minutes at 20° C. to 200° C., and precipitating said nascent membrane in a coagulation bath at 0° C. to 80° C., said coagulation bath being a non-solvent for the poly(phenylene oxide) while being miscible with the main constituent of the solvent mixture.

2. The process of claim 1 wherein the nascent membrane is dried at from 70° C. to 125° C.

3. The process of claim 2 wherein the poly(2,6-dimethylphenylene-1,4 oxide) is dissolved in the aprotic solvent at 70° C. to 125° C.

4. The process of claim 3 wherein the aprotic solvent is N-methylpyrrolidone, N,N-dimethylacetamide or mixtures thereof.

5. The process of claim 4 wherein the nascent membrane is dried from 0.05 to 5.0 minutes.

6. The process of claim 5 wherein the coagulation bath consists essentially of a lower alcohol containing from 1 to 10 carbon atoms, a lower ketone containing from 1 to 10 carbon atoms, water or mixtures thereof.

7. The process of claim 6 wherein the coagulation bath consists essentially of water.

8. The process of claim 3 wherein the aprotic solvent is a mixture of an aprotic solvent and an aromatic cosolvent.

9. The process of claim 8 wherein the aprotic solvent component is N-methylpyrrolidone, N,N-dimethylacetamide or mixtures thereof.

10. The process of claim 9 wherein the nascent membrane is dried from 0.05 to 5.0 minutes.

11. The process of claim 10 wherein the coagulation bath consists essentially of a lower alcohol containing from 1 to 10 carbon atoms, a lower ketone containing from 1 to 10 carbon atoms, water or mixtures thereof.

12. The process of claim 11 wherein the coagulation bath consists essentially of water.

13. The process of claim 8 wherein the aromatic cosolvent is toluene, xylene, or mixtures thereof.

14. The process of claim 13 wherein the nascent membrane is dried from 0.05 to 5.0 minutes.

15. The process of claim 14 wherein the coagulation bath consists essentially of a lower alcohol containing from 1 to 10 carbon atoms, a lower ketone containing from 1 to 10 carbon atoms, water or mixtures thereof.

16. The process of claim 15 wherein the coagulation bath consists essentially of water.

17. The process of claim 3 wherein the aprotic solvent is a mixture of an aprotic solvent and a nonsolvent.

18. The process of claim 17 wherein the aprotic solvent component is N-methylpyrrolidone, N,N-dimethylacetamide or mixtures thereof.

19. The process of claim 17 wherein the nonsolvent component is dipropylene glycol.

20. The process of claim 19 wherein the nascent membrane is dried from 0.05 to 5.0 minutes.

21. The process of claim 20 wherein the coagulation bath consists essentially of a lower alcohol containing from 1 to 10 carbon atoms, a lower ketone containing from 1 to 10 carbon atoms, water or mixtures thereof.

22. The process of claim 21 wherein the coagulation bath consists essentially of water.

23. The process of claim 1 wherein the nascent membrane is dried from 0.05 to 5.0 minutes.

24. The process of claim 23 wherein the coagulation bath consists essentially of a lower alcohol containing from 1 to 10 carbon atoms, a lower ketone containing from 1 to 10 carbon atoms, water or mixtures thereof.

25. The process of claim 24 wherein the coagulation bath consists essentially of water.

26. A gas separation membrane prepared by the process of claim 1.

27. A process for separating at least one gas from a gaseous mixture comprising bringing said gaseous mixture into contact with the gas separation membrane of claim 26 under conditions whereby one gas of said gaseous mixture permeates said membrane preferentially to at least one other gas of said mixture.

* * * * *